United States Patent [19]
Linder et al.

[11] Patent Number: 5,039,421
[45] Date of Patent: Aug. 13, 1991

[54] SOLVENT STABLE MEMBRANES

[75] Inventors: Charles Linder, Rehovot; Mordechai Perry, Petach Tikva; Mara Nemas, Neve Monosson; Reuven Katraro, Rishon Lezion, all of Israel

[73] Assignee: Aligena AG, Basel, Switzerland

[21] Appl. No.: 415,156

[22] Filed: Oct. 2, 1989

[51] Int. Cl.$^5$ .............................................. B01D 69/12
[52] U.S. Cl. ..................................... 210/651; 210/654; 210/490; 210/500.43
[58] Field of Search .................... 210/654, 500.43, 490, 210/500.37, 500.41, 500.35, 500.36, 651; 427/245, 246; 525/349

[56] References Cited

U.S. PATENT DOCUMENTS

| | | | |
|---|---|---|---|
| 4,477,634 | 10/1984 | Linder et al. | 525/348 X |
| 4,690,765 | 9/1987 | Linder et al. | 210/500.28 X |
| 4,704,324 | 11/1987 | Davis et al. | 210/500.42 X |

*Primary Examiner*—Frank Spear
*Attorney, Agent, or Firm*—Michael L. Keller

[57] ABSTRACT

A composite membrane for separating at least one dissolved or suspended component from a liquid phase, and characterized by solvent stability, comprises:

(A) a substrate microfiltration, ultrafiltration or reverse osmosis membrane which has been initially formed from at least one member selected from non-crosslinked acrylonitrile homopolymers and copolymers, and non-crosslinked substituted acrylonitrile homopolymers and copolymers, and which has been subjected to at least one in situ crosslinking reaction; and (B) superimposed upon the substrate membrane, at least one coating including at least one component selected from hydrophilic monomers containing reactive functions, hydrophilic oligomers containing reactive functions and hydrophilic polymers containing reactive functions, such reactive functions having been subjected to a post-coating crosslinking reaction.

44 Claims, No Drawings

SOLVENT STABLE MEMBRANES

FIELD OF THE INVENTION

The present invention relates to solvent stable membranes and to processes for preparing them.

BACKGROUND OF THE INVENTION

Microfiltration (MF), Reverse Osmosis (RO) and Ultrafiltration (UF) membranes are often made from polymers, which swell and dissolve in organic solvents. Such polymeric membranes may dissolve in different solvents, but generally the best solvents for dissolving the polymers are dimethylformamide (DMF), N-methylpyrrolidone (NMP), dimethylsulfoxide (DMSO), hexamethyl phosphoramide, sulfolane (tetramethylene sulfone) and N,N-dimethylacetamide.

There are many potential membrane applications which could usefully employ solvent stable membranes. Such applications are e.g. in the areas of food technology, biotechnology, the treatment of waste streams, chemical manufacturing and petrochemicals. These solvent stable membranes are desirably also swelling resistant, because swelling of such membranes under pressure would indicate solvent/membrane interaction and thus polymer chain mobility, which usually results in compaction, and loss of flux and of performance generally, under pressure.

A particular advantage of such solvent stable membranes would be, that they could be exposed to a variety of solvent media including aqueous solutions, suspensions or emulsions, as well as to organic solvents which contain solutes.

There are presently available solvent stable membranes in the form of ceramics or other inorganic materials and specialized crosslinked polymers. These, however, are expensive, limited in cutoff range to MF and UF, and restricted in practice to certain configurations. Besides ceramics, there are available membranes from crosslinked polymers such as epoxy polyimide type polymers, as well as encapsulated polymers. Encapsulated polymers are described in U.S. Pat. No. 4,778,596; the membranes are coated on the external surfaces and on the internal pore surfaces with an aqueous polymer which is then crosslinked. The support membrane is not crosslinked, but encapsulated in an outer skin; such membranes swell but do not dissolve, upon immersion in organic solvents. Crosslinked polyimides commercialized by NITTO (Japan) have some solvent resistance but limited pH/temperature stability; in addition, the membranes are limited to the UF range with low efficiency in operation.

SUMMARY OF THE INVENTION

It is an object of the present invention to provide membranes which do not dissolve in, and preferably also do not swell in, organic solvents.

Another object of the invention is to provide such membranes which are oxidation resistant, solvent resistant, and have a broad pH and temperature stability.

Still another object of the invention is to provide such membranes with a broad range of molecular weight cut-off limits.

A further object of the invention is to provide such membranes which are relatively economical to manufacture and which can be made in a multiplicity of useful shapes.

Other objects of the invention will appear from the following description.

The present invention relates to a composite membrane, in which the underlying substrate membrane is a microfiltration (MF), ultrafiltration (UF) or Reverse Osmosis (RO) membrane, the substrate being based on optionally substituted acrylonitrile polymers, including homopolymers and copolymers. The substrate is crosslinked, and thereafter coated with a polymer and subjected to a post-coating treatment.

According to one embodiment of the invention, there is provided a composite membrane which comprises:

(A) a substrate microfiltration, ultrafiltration or reverse osmosis membrane which has been initially formed from at least one member selected from non-crosslinked acrylonitrile homopolymers and copolymers, and non-crosslinked substituted acrylonitrile homopolymers and copolymers (in which the substituent may be e.g. alkyl, aryl, halogen or thio), and which has been subjected to at least one in situ crosslinking reaction; and (B) superimposed upon the substrate membrane, at least one coating including at least one component selected from the group consisting of hydrophilic monomers containing reactive functions, hydrophilic oligomers containing reactive functions and hydrophilic polymers containing reactive functions, the reactive functions having been subjected to a post-coating crosslinking reaction.

The at least one in situ treatment step may comprise at least one of the following steps, provided that when more than one such step is to be effected, then these are carried out in the stated sequence commencing with any of steps (a), (b) or (c):

(a) treatment with at least one member selected from the group consisting of acids, bases, and free radical initiators;
(b) heating at a temperature which is below about 130° C.;
(c) heating at a temperature in the region of about 110° to about 130° C.;
(d) heating at a temperature above about 130° C. and below about 250° C.;
(e) heating at a temperature in the region of about 250° C.;
(f) heating at a temperature above about 250° C. and below about 600° C.;
(g) heating at a temperature within the range of from about 600° C. to about 1000° C.;

and the thus-obtained substrate membrane is cooled to a temperature which is at most about 130° C.

In a particular embodiment, the present invention provides a process for separating at least one dissolved or suspended component from a liquid phase, which comprises contacting the liquid phase under a superatmospheric pressure greater than the osmotic pressure with the inventive composite membrane, and thereafter recovering the dissolved or suspended component.

This process may, e.g., be applied to the separation of at least one inorganic salt from at least one organic compound e.g. of molecular weight in the range 150-2000, for example in the range of from about 150 to about 1500 (preferably from about 150 to about 1000, more preferably from about 150 to about 300), in aqueous media. In general terms, the process may be applied for the separation from aqueous media of monosaccharides, disaccharides or polysaccharides. The process may also be applied to the separation of insoluble particles, colloidal particles, soluble polymers and other solute molecules from an organic solvent, e.g. from alcohols, ethers, esters dimethylformamide, N-methylpyrrolidone or dimethyl sulfoxide, and to the concentration of organic or inorganic solutes from aqueous streams, water/organic solvent mixtures, or organic solvents alone. Thus the term "separation" in the present specification and claims is to be understood as including "concentration", where the context permits. It is believed that the present invention will also find utility in a process for the separation of undesired solute molecules from juices and other extracts of fruit and vegetable origin.

DETAILED DESCRIPTION OF THE INVENTION

The substrate membrane may be supported on a porous support, such as, for example, one fabricated from a member selected from non-woven and woven cellulosics, polyethylene, polypropylene, nylon, vinyl chloride homo- and co-polymers, polystyrene, polyesters such as polyethylene terephthalate, polyvinylidene fluoride, polytetrafluoroethylene, glass fibers, porous carbon, graphite, inorganic supports based on alumina and/or silica, and such inorganic supports coated with zirconium oxides. Whether supported or not, the substrate membrane may be formed into any desired shape, e.g. a hollow fiber or tubelet, or it may be planar.

Following the post-coating crosslinking reaction, the composite membrane may be subjected to at least one reaction which introduces at least one function selected from the group consisting of amino, hydroxyl, quaternary ammonium, carboxylic and sulfonic groups.

The thickness of the crosslinked coating may, for example, lie within the range of from about 1 to about 5000 nm.

Coating of the substrate acrylonitrile polymer-derived membrane may be effected by immersion, spraying or other surface contact with a solution. The effect of crosslinking both substrate and coating, will be a membrane which swells very little in aqueous, organic or mixed solvents.

In an embodiment of the invention, polyacrylonitrile, insolubilized and crosslinked as will be described infra, may be used as the polymer of which the underlying substrate is comprised. Such membranes based on polyacrylonitrile afford stability to solvents, pH and temperature, over a wide range of pore sizes. They tend to be more stable to a wider variety of solvents. The polyacrylonitrile membranes may be subjected to the steps of immersion in, or exposure to, reagents, and/or heating; as e.g., treatment with base (organic or inorganic) and heating. The conditions for treatment must be chosen so as not to destroy the structure. Tightening of the membrane may occur, but this would allow improvement in cutoffs. If excessive tightening does occur, then one may choose a more open membrane, initially.

Casting of the substrate membrane, comprised of acrylonitrile-derived polymers, may be performed by any number of casting procedures cited in the literature, for example U.S. Pat. Nos. 3,556,305, 3,567,810, 3,615,024, 4,029,582 and 4,188,354; GB 2,000,720; Office of Saline Water R & D Progress Report No. 357, October 1967; Reverse Osmosis and Synthetic Membranes, Ed. Sourirajan; Murari et al, J. Membr. Sci. 16: 121–135 and 181–193 (1983). Thus, the polymer or its derivatives may be dissolved in a suitable solvent or solvent mixture (e.g. NMP, DMF, DMSO, hexamethylphosphoramide, N,N-dimethylacetamide, dioxane), which may or may not contain cosolvents, partial solvents, nonsolvents, salts, surfactants or electrolytes, for altering or modifying the membrane morphology and its flux and rejection properties (e.g. acetone, ethanol, methanol, formamide, water, methyl ethyl ketone, triethyl phosphate, sulfuric acid, HCl, partial esters of fatty acids and sugar alcohols, or their ethylene oxide adducts, sodium dodecyl sulfate, sodium dodecylbenzene sulfonate, NaOH, KCl, zinc chloride, calcium chloride, lithium nitrate, LiCl, magnesium perchlorate, etc.).

The casting solution may be filtered by any of the known processes (e.g. pressure filtration through microporous filters, or by centrifugation), and cast on a support such as glass, metal, paper, plastic, etc., from which it may then be removed. It is preferred, however, to cast onto a porous base substrate from which the membrane is not removed. Such porous base substrates may be non-woven, or woven, including cellulosics, polyethylene, polypropylene, nylon, vinyl chloride homo- and co-polymers, polystyrene, polyesters such as polyethylene terephthalate, polyvinylidene fluoride, polytetrafluoroethylene, polysulfones, polyether sulfones, polyether ketones, polyphenylene oxide, glass fibers, porous carbon, graphite, inorganic membranes based on alumina and/or silica (possibly coated with zirconium and/or other oxides). The membrane may otherwise be formed as a hollow fiber or tubelet, not requiring a support for practical use; or the support may be of such shape, and the membrane is cast internally thereon.

The concentration of polymer in the casting solution may vary as a function of its MW and additives, and may be for example, within the range of about 5–80%, preferably about 10–50%, most preferably about 15–30%. The casting temperature may vary from about −20° to about 100° C., preferably about 0° to 60° C., depending on the particular polymer, its molecular weight and the cosolvents and additives in the casting solution.

The casting solution may be applied to the above-mentioned supports or porous substrates by any of the well-known techniques which are familiar to those skilled in the art. The wet film thickness may lie within the range of about 15 microns to about 5 mm., preferably about 50 to about 800 microns, most preferably about 100 to about 500 microns for flat membranes; tubelets may of course have thicker walls. The wet supported film may be immersed immediately, or after a partial drying step (of from about 5 secs. to about 48 hours, under ambient conditions or elevated temperature and/or under vacuum), in a gelling bath of a nonsolvent. Such baths generally comprise water, to which there may optionally be added a small percentage of a solvent (e.g. DMF or NMP) and/or surfactant (e.g. sodium dodecyl sulfate), at a temperature within the range of about 0° to about 70° C. An example of a widely used gelling bath is water with 0.5% sodium dodecyl sulfate at 4° C. In another mode of forming membranes, a polymer solution containing a component which may be leached out in water or other solvent, is cast and dried prior to immersion; the subsequent immersion step removes leachable material, resulting in a porous membrane. In a third variation, a polymer solution without any leachable materials is cast and taken to dryness, resulting in a porous membrane by virtue of the physicochemical properties of the particular polymer and solvent and/or other ingredients present in the casting solution, whereby pores are created. The foregoing cast membranes may then be coated, and optionally otherwise modified, as described elsewhere herein.

As mentioned above, the solvent- and pH-resistant membranes which are to be coated, comprise crosslinked acrylonitrile homo- and co-polymers in the RO, UF and MF ranges, and include asymmetric and symmetric membranes. These polymers may be formed into membranes having a thickness of from about 10 microns to 10 mm., preferably from about 50 microns to about 500 microns, by casting alone or on a support, in any of the configurations as has already been described. Such polymeric membranes are subsequently subjected to crosslinking by a combination of chemical reactions and heating. In acrylonitrile copolymers, the proportion of acrylonitrile is preferably at least about 20%, more preferably at least about 50%, and most preferably at least about 85% by weight, of the total monomers. In place of acrylonitrile itself in these membrane-forming homo-and co-polymers, there may alternatively be used substituted acrylonitriles, e.g. $C_{1-6}$-alkylacrylonitriles such as methacrylonitrile and hexylacrylonitrile, arylacrylonitriles such as phenylacrylonitrile, haloacrylonitriles (in which halo signifies fluoro, chloro or bromo) such as fluoroacrylonitrile and chloroacrylonitrile, and thioacrylonitrile. Suitable comonomers which can be copolymerized with acrylonitriles and substituted acrylonitriles include monomers which may contain hydrophobic, hydrophilic, polar or ionic groups, especially, e.g., vinyl esters having 2 to 18 carbon atoms in the acid moiety, such as vinyl acetate; vinyl ethers having 3 to 12 carbon atoms; vinylpyridine; vinyl chloride; styrene; and acrylic and methacrylic acids and esters thereof having e.g. 1 to 4 carbon atoms in the ester moiety. Further suitable comonomers are maleic anhydride; 2-aminoethyl methacrylate; allyl compounds such as allyl alcohol, allyl- and methallylsulfonic acids and their salts (e.g. alkali metal salts), allyl and methallyl halides, allylamines and allyl p-toluenesulfonate. The term "acrylonitrile (or substituted acrylonitrile) copolymers" is intended to include such copolymers comprising more than 2 monomers, e.g. terpolymers such as acrylonitrile/styrene/butadiene ("ABS polymers"), acrylonitrile/methyl methacrylate/vinyl acetate and acrylonitrile/methyl methacrylate/sodium allylsulfonate, and quadripolymers. The substrate membrane may also be made from mixtures of acrylonitrile (or substituted acrylonitrile) homopolymers and/or copolymers.

The membrane derived from acrylonitrile (or substituted acrylonitrile) -derived polymers, once formed, is insolubilized by crosslinking, which may be effected with organic or inorganic bases, acids or free-radical initiators, followed by heating if necessary. Organic bases are preferably used for this purpose.

The term "organic bases" in this context includes amines, and in particular metal $C_{1-10}$ straight or branched chain alkoxides such as sodium or potassium methoxide, ethoxide, propoxide, isopropoxide, butoxide or tert.-butoxide. Also preferred are inorganic bases e.g. alkali metal hydroxides such as sodium or potassium hydroxide. In general, the metal alkoxides are utilized in alcoholic medium, while the alkali metal hydroxides are utilized in aqueous medium. In either case, the concentrations of the bases may vary in the range of from about 0.01 to about 50%, preferably from about 0.05 to about 20%, wt./vol. Other utilizable inorganic bases are hydroxylamine, ammonia and alkali metal amides.

Thus, for example, the membrane may be immersed in a solution of a base such as sodium or potassium alkoxide, or NaOH or KOH, at a concentration of between about 0.05 and about 1.0% wt./vol. in methanol or ethanol, for the alkoxide bases, and between about 1 and about 20% wt./vol. for the hydroxide bases in water, for a time which lies between about 5 minutes and about 8 hours, preferably at a minimum temperature of about 15° C., most preferably at least about 30° C., and up to about the reflux temperature of the particular solvent used.

A person skilled in the art may readily determine the times required for treating the membrane with bases in order that the product will not swell to an undesirable extent when immersed in solvents such as dimethyl formamide (DMF) or 1-methylpyrrolidin-2-one (NMP); it is preferred that such swelling is no more than about 50%, more preferably no more than about 15%, and especially no more than about 5%. Following the treatment just described, the membrane is drained and heated at an elevated temperature, e.g. by placing in an oven at a temperature which is gradually raised from about 10° C. above room temperature to (say) about 110° to about 130° C. (Alternatively, if the length of time at elevated temperature is kept below a determinable certain value, e.g. 15 minutes at 110° C., the elevated temperature need not be increased, without unduly reducing the flux of the resulting membrane.) The purpose of effecting at least some crosslinking prior to heating above the glass transition point of the membrane is to prevent plastic flow and closing of the membrane pore structure. While some closure may be tolerated and in fact be desirable, in order to improve rejection, this should not lower water flux below economically acceptable levels for the given application. The flux level is best controlled by crosslinking as much as possible before the step of heating at an elevated temperature, as described above.

After heating to (say) about 110° to about 130° C., the membrane may be further insolubilized or crosslinked by heating (e.g. in air) in the region of about 250° C. for a time period of several minutes up to several hours, but this must be done carefully to prevent compaction. If desired, the membrane may be carbonized by heating in a non-reactive environment to (say) approximately 600° to 1000° C.. For this purpose, it is preferred that the membrane be in the form of hollow fibers or a planar membrane and supported by porous ceramic, carbon or metal tubelets or plates. Preferably, the crosslinking step may be carried out on a copolymer of polyacrylonitrile with acrylic acid or itaconic acid which are known to accelerate the crosslinking reaction.

Crosslinking the optionally substituted acrylonitrile-derived polymer of the membrane may alternatively be effected by use of organic or inorganic acids, including Lewis acids such as hydrogen halides (e.g. HBr), p-toluenesulfonic acid, stannic chloride, aluminum halides (e.g. the trichloride, tribromide or triiodide) and zinc chloride.

In accordance with an embodiment of the invention, the substrate membrane, which has been treated in accordance with the above description, is then coated. The coating method may comprise coating with a polymer solution; this coating is then crosslinked with either ionic, polar or hydrophobic crosslinkers. This crosslinking step may be done by immersing the coated membrane (after draining, wiping and drying from excess coating material) in an aqueous hydrophobic or hydrophilic solution of the crosslinker. After such immersion, the crosslinked film may be heated or exposed to another solution which may contain other crosslinkers or monomeric reagents to further modify the physicochemical properties of the membrane. In addition, the coating solution may contain crosslinkers which are activated when heated, or exposed to pH changes. The same coating solution may also contain reagents for modifying the coating polymer with respect to the hydrophilic/hydrophobic balance, or difunctional monomers which may react with the crosslinking reagents in subsequent solutions.

The coating methods may be taken entirely or in part from Israel patent application (07109) and/or U.S. Pat. Nos. 4,690,765, 4,690,766, 4,778,596, 4,767,645 and 4,259,183, and EP 56175. In general, any method used to make RO, intermediate RO/UF and UF membranes, which require an ultrafiltration support, which is subsequently modified or coated, and the coating further reacted to crosslink it, may be used in this approach. The foregoing patents are examples of such coating or modification procedures. The procedures generally entail one or more coating steps of a polymer in solution, and one or more crosslinking and modifying steps by reagents or heating. The reagents may be in aqueous or nonaqueous solvents and in some cases may be incorporated in the polymer coating solution itself.

Hydrophilic polymers (coating polymers) may be used to coat the semipermeable crosslinked membrane substrate with one or more (e.g. one or two) coatings. The hydrophilic polymers may be polyfunctional oligomers or polymers which contain active hydrogen atoms bound to oxygen, sulfur or (preferably) nitrogen atoms. The nitrogen atoms may be present as aliphatic (acyclic or cyclic), aromatic or heterocyclic amino groups, which can be primary, secondary or tertiary. Alternatively, the hydrophilic polymers may contain quaternary ammonium, pyridinium, sulfonium or phosphonium ions. Examples of hydrophilic polymers are polyethyleneimines (MW 150 to 200,000), polyvinyl alcohols and partially esterified polyvinyl alcohols, polyvinylamines, polyvinylanilines, polyphenols, cellulose derivatives, polybenzylamines, polybenzyl alcohol, polyvinylmercaptans, polymers of 2-hydroxyethyl- or 2-aminoethyl-methacrylates, or in general of hydroxyalkyl acrylates and of methacrylates where "hydroxyalkyl" contains from 1 to 6 carbon atoms, polymers described in EP 10425, polyimidazolines, amine-modified polyepihalohydrins (described in GB 1,588,807), polydiallylamine derivatives, polymers containing piperidine rings (described in GB 2,027,614), aminopolysulfones, aminopolyarylene oxides (e.g. aminoethylated polyphenylene oxide), amine-modified polymers based on epoxides, hydrophilic amino group-containing polymers, polyamide/polyamine/epichlorohydrin condensation products, condensation products of dicyandiamide, amine (ammonium) salts and formaldehyde (U.S. Pat. No. 3,290,310) and copolymers of styrenesulfonate (sodium salt)/vinylaniline, 2-amino-ethylmethacrylate/acrylic acid, vinylaniline/vinylbenzyltrimethyl ammonium chloride, vinylamine/vinylsulfonate, vinylbenzylaniline/vinylbenzyldimethylsulfonium chloride, or copolymers of polybenzylamine, polyvinyl alcohol, polyalkylamine, polyvinylamine or polyvinylaniline with vinylbenzyl sulfonium, phosphonium or ammonium derivatives.

The above polymers may be in part copolymers or polymers containing other monomeric units, block polymers or graft polymers. If they are copolymers, the other monomeric units may or may not contain ionic groups, such as sulfonate, carboxylate, tertiary ammonium, sulfonium or phosphonium. The coating polymers in EP 31730, 72002 and 56175 may be used in the present invention.

One especially preferred polymer comprises polyaliphatic (acyclic or cyclic) amines. Polyethyleneimine is an example of this group. The range of molecular weights may be between 150 and 2,000,000, but preferably between 1000 and 200,000, most preferably between 10,000 and 70,000. Low molecular weight polymers or oligomers (MW 150-1000) may be used, but the increase in solute rejection of the final membrane is not as great as when higher molecular weight polymers are used. Polyallylamines and polyvinylamines may also be used as coating polymers.

In another preferred case, water soluble and ampho- teric or block mosaic polymers containing both cationic and anionic groups together with a reactive function (e.g. —NH$_2$ or OH groups) for reaction with the polyfunctional crosslinking agents, are useful for forming a mixed charge membrane. These membranes are particularly useful for separating salt from relatively low molecular weight organic solutes. Examples of such coating polymers are poly(vinylamine/vinylsulfonate) and partially quaternized derivatives.

In a preferred embodiment, the at least one in situ chemical reaction is effected at least with a polyfunctional reactant (which may be ionic or nonionic). This polyfunctional reactant is in particular capable of creating bonds with the reactive functions in the coating. Such reactants possess their reactivity by virtue of the presence of reactive multiple bonds, and/or epoxide, aziridine, aldehyde, imidate, isocyanate, isothiocyanate, hydroxyl, carboxylic anhydride, acyl halide, carbonic imide halide and N-methylol groups, and/or by virtue of the presence of detachable tertiary amine groups (or quaternary groups such as Me$_4$N— or pyridinium, from which tertiary amines may be detached) and/or of other leaving groups (e.g. anions, especially halides); reactive groupings including moieties such as

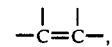

—CO—C≡C— or

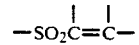

may be present. The leaving groups may possess their reactivity by virtue of the influence of e.g. electrophilic groups, such as —CO— or —SO$_2$—, in saturated aliphatic radicals; of a quaternary nitrogen atom such as in the group =N—CH$_2$CH$_2$Cl; or of electrophilic groups in the o- or p-position in aromatic radicals, such as nitro, hydrocarbonsulfonyl or hydrocarboncarbonyl groups, or of the bond to a ring carbon atom, which is adjacent to a tertiary nitrogen ring atom as in a halogenotriazine or halogenopyrimidine compound.

Examples of nonionic polyfunctional reactants which are advantageous are cyclic carbonic acid imidehalides, and in particular halogeno-diazines or -triazines containing at least two reactive substituents, as well as compounds containing isocyanate or isothiocyanate groups. Especially advantageous are tetrachloropyrimidine and cyanuric chloride. The cyclic carbonic acid imide-halides may be, for example:

A. s-Triazines containing at least two identical or different halogen atoms bonded to carbon atoms, e.g. cyanuric chloride, fluoride or bromide, and also primary condensation products of any of these cyanuric halides with water, ammonia, amines (e.g. alkylamines, anilines), alkanols, alkylmercaptans, phenols or thiophenols.

B. Pyrimidines containing at least two reactive, identical or different halogen atoms, such as 2,4,6-trichloro-, 2,4,6-trifluoro- or 2,4,6-tribromo-pyrimidine, which can be further substituted in the 5-position, e.g. by an alkyl, alkenyl, phenyl, carboxyl, cyano, nitro, chloromethyl, chlorovinyl, carbalkoxy, carboxymethyl, alkylsulfonyl, carbamoyl or sulfamoyl group, but preferably by halogen, for example, chlorine, bromine or fluorine; particularly suitable halogenopyrimidines are 2,4,6-trichloro- and 2,4,5,6-tetrachloropyrimidine, and derivatives of pyrimidine similar to those of group A, above.

C. Halogenpyrimidinecarboxylic acid halides, e.g. dichloropyrimidine-5- or -6-carboxylic acid chloride.

D. 2,3-Dihalogeno-quinoxaline-, -quinazoline-, or -phthalazine-carboxylic or -sulfonic acid halides, such as e.g. 2,3-dichloroquinoxaline-6-carboxylic acid chloride or bromide.

E. 2-Halogeno-benzothiazole- or -benzoxazole-carboxylic acid halides or -sulfonic acid halides, e.g. 2-chlorobenzothiazole- or -benzoxazole-5- or -6-carboxylic acid chloride or -5- or -6-sulfonic acid chloride.

F. Halogeno-6-pyridazonyl-1-alkanoyl halides or 1-benzoyl halides, 4,5-dichloro-6-pyridazonyl-1-propionyl chloride or -1-benzoyl chloride.

Further compounds which contain at least two reactive substituents and can be employed, are, for example:

G. Anhydrides or halides of aliphatic, $\alpha$, $\beta$-unsaturated mono- or di-carboxylic acids having preferably 3 to 5 carbon atoms, such as maleic anhydride, acryloyl chloride, methacryloyl chloride and propionyl chloride.

H. Carboxylic acid anhydrides or halides of aliphatic mono- or di-carboxylic acids having preferably 3 to 10 carbon atoms, or of aromatic carboxylic acids, containing reactive halogen atoms e.g. chloroacetyl chloride, $\beta$-chloropropionyl chloride, $\alpha,\beta$-dibromopropionyl chloride, $\alpha$-chloro- or $\beta$-chloroacryloyl chloride, chloromaleic anhydride and $\beta$-chlorocrotonoyl chloride, and fluoro-nitro- or chloro-nitro-benzoic acid halides or -benzenesulfonic acid halides, in which the fluorine atom or the chlorine atom is in the o-position and/or p-position relative to the nitro group.

I. Carboxylic acid N-methylolamides or reactive functional derivatives of these methylol compounds. Carboxylic acid N-methylolamides are in particular N-methylol-chloroacetamide, N-methylol-bromoacetamide, N-methylol-$\alpha,\beta$-dichloro- or -dibromopropionamide, N-methylol-acrylamide, and N-methylol-$\alpha$-chloro- or -$\alpha$-bromo-acrylamide. Reactive derivatives of the carboxylic acid N-methylolamides, are e.g. the corresponding N-chloromethyl- or N-bromomethyl-amides.

J. Free or etherified N-methylolureas or N-methylolmelamines, e.g. N,N-dimethylolurea and its dimethyl ether, N,N'-dimethylolethylene- or propylene-urea, 4,5-dihydroxy-N,N'-dimethylolethyleneurea or 4,5-dihydroxy-N,N'-dimethylolethyleneurea dimethyl ether and di- to hexamethylolmelamine, trimethylolmelamine dimethyl ether, pentamethylolmelamine di- or tri-methyl ether, and hexamethylolmelamine penta- or hexa-methyl ether.

K. Condensation products of diarylalkanes containing at least one phenolic hydroxyl group and halogenhydrins, for example the diepoxide obtained from 2,2-bix-(4-hydroxyphenyl)propane and epichlorohydrin, as well as glycerol triglycidyl ethers and also corresponding diaziridines.

L. Dialdehydes, e.g. glutaraldehyde or adipaldehyde.

M. Diisocyanates or diisothiocyanates such as ($C_{2-4}$-alkylene) diisocyanates e.g. ethylene diisocyanate; (optionally $C_{1-4}$-alkyl substituted) phenylene diisocyanates or diisothiocyanates, e.g. phenylene-1,4-diisocyanate, toluene-2,4-isocyanate or phenylene-1,4-diisothiocyanate.

N. Further reactive compounds such as (trisacryloyl)hexahydro-s-triazine, epoxides or aziridines.

Preferred ionic polyfunctional reactants are ionic or charged derivatives of triazinyl or pyrimidinyl compounds. Reactive azo dyes (containing sulfonic acid, carboxyl or ammonium groups) belong to this class as do non-colored compounds with the aforementioned functions. An effective reactant may crosslink via chemical bonds, electrostatic interactions of ionic groups, and by chelation or coordination of polymeric functions with metal ions. The preferred mode of crosslinking is via a covalent bond, although the other two modes may also be used. In some cases all three modes of crosslinking may be operative via application of a single component (e.g. the dye of formula 101) or may be reached by sequential or parallel application of two or three different compounds (dyestuff and metal salt).

Multivalent metal salts that may find application in crosslinking the coating via chelation or coordination bonds are for example, $CuSO_4$, $CrCl_3$ and $FeCl_3$. These salts may be applied alone, in combination with each other, or in combination with covalent (ionic) binding compounds.

Included within the scope of this invention are also ionic polyfunctional reactants containing such reactive groups as epoxides, aziridines, anhydrides, and preferably cyclic carbonic acid imide halides (cyanuric chloride or tetrachloropyrimidine), dihalides of dicarboxylic acids, dialdehydes or trihalides of tricarboxylic acids. While many of these reactants can be applied in aqueous solutions within a narrow range of pH and temperature, the acyl halides must be dissolved in aprotic solvents.

In one mode of operating the invention, the top surface of the coating is modified by contact the still wet coating layer with an organic solution of crosslinking agent containing at least two functional groups which react with reactive functions of polymers and monomers in the surface layer of the coating. The thickness of this layer is determined by the extent of diffusion of the crosslinker into the coating and diffusion of reactive components present in the latter, into the interfacial layer.

The crosslinking agents used in interfacial crosslinking or polymerization for modifying the outermost layer may be chosen from those compounds which have already been discussed as being useful crosslinking agents, provided that they dissolve in water immiscible aprotic organic solvents. Exemplary crosslinkers are e.g. halogenated diazines (e.g. pyrimidines) and triazines (e.g. s-triazines) such as trihalogenotriazines containing fluoro, bromo and/or (preferably) chloro atoms, isocyanates, isothiocyanates, sulfonyl halides and carboxylic acid halides, but the crosslinking agents may otherwise be aromatic, heterocyclic, cycloaliphatic or acyclic (the two latter containing e.g. 5–12 carbon atoms) compounds containing as reactive atoms or groups (e.g.) isocyanate or isothiocyanate groups or reactive halogen atoms as in sulfonyl halides or carboxylic acid halides. When such compounds are aromatic, they may be (e.g.) benzene or naphthalene compounds, or they may have the formula Ar-X-Ar, where Ar is carbocyclic aryl, such as optionally substituted phenyl and X is a divalent link such as a direct bond, or —O—, —CO—, —SO$_2$—, C$_{1-4}$ alkylene such as —CH$_2$—, —(CH$_2$)$_2$— or —C(CH$_3$)$_2$—, or C$_{2-4}$ alkylidene such as —CH=CH—; an exemplary aromatic compound is toluene-1,3-diisocyanate (TDI). When such compounds are heterocyclic, they may be e.g. pyridine, pyrrole, furan or thiophene compounds.

Crosslinking agents based on triazine and diazine structures with reactive halogen atoms (especially chloro and bromo) are for example 1,3,5-trichlorotriazine (cyanuric chloride) and tetrachloropyrimidine, in either of which one of the chloro atoms may be optionally replaced by alkylamino, dialkylamino or alkoxy groups, as well as pyrimidines (including fluorochloropyrimidines) substituted by alkylamino, dialkylamino or alkoxy groups, and/or by phenyl and alkyl radicals, any alkyl or alkoxy present therein containing preferably 1–6 carbon atoms.

Mixtures of crosslinking agents can also be used. These may be applied from a single solution [such as trimesoyl chloride (TMC) and benzene-1,3-disulfonyl chloride (BDC), e.g. 0.3% TMC+0.1–0.2% BDC, in n-hexane, for example], or from different solutions applied serially. Once instructed as to the concepts and the alternative procedures available in accordance with the present invention, it is within the competence of a person of ordinary skill in the art to determine whether the order of application of two crosslinking agents applied serially is of importance; by way of example, it has been found that TMC can be applied first and then BDC or TDI, but the reverse procedure is not satisfactory. Benzene-1,2,4,5-tetracarboxylic acid chloride gives good results, either alone, or in combination with TMC.

The organic solvents used to dissolve the crosslinking agents may be selected from, for example, hexane, heptane, petroleum ethers, naphtha, cyclohexanes and halogenated hydrocarbons such as methylene chloride, chloroform, tetrachloroethane or trichlorotrifluoroethane. The solvents used for applying the crosslinking agents should neither react with them, nor dissolve the coating to be crosslinked. The concentration of crosslinker(s) may be e.g. in the range of from about 0.01 to about 15 wt. %, preferably lying in the range of from about 0.1 to about 1.0 wt. %. The crosslinking may be conducted in the presence of surfactants, and proton acceptors such as amines, alkali metal hydroxides, pyridine, 2,6-dialkylpyridines, phosphates, triethanolamine, N,N-diethylaniline and N-methylpiperidine.

A presently preferred mode of processing the crosslinked acrylonitrile substrates in accordance with the present invention, is by utilizing the procedure of Israel Patent Application No. (07109). The products of the present invention are especially characterized, however, by being solvent resistant. The aforementioned Israel Patent Application provides a composite membrane which comprises:

a porous semipermeable membrane substrate; and a coating superimposed thereon which includes at least one member selected from:
monomers containing at least one diazonium group,
polymers containing at least one diazonium group,
monomers containing at least one primary amino group and which have been exposed to the action of at least one member selected from nitrous acid and other reagents which potentially react with primary amine groups to form diazonium groups, and
polymers containing at least one primary amino group and which have been exposed to the action of at least one member selected from nitrous acid and other reagents which potentially react with primary amine groups to form diazonium groups;
and wherein the coating has been subjected to at least one in situ chemical reaction with loss of any diazonium groups which may be present, and with formation of valence links in at least one of the modes (i), (ii) and (iii), namely: (i) among different moieties of the at least one member between themselves; (ii) between moieties of the at least one member and the material of the substrate; and (iii) between moieties of the at least one member and a polyfunctional reactant.

When this process is adapted for purposes of the present invention, it will be appreciated that a crosslinked acrylonitrile polymer substrate (as described elsewhere herein) replaces above component (a). It will further be appreciated that the formation of valence links referred to can take place in all three modes (i), (ii) and (iii).

In a preferred embodiment of this aspect of the invention, the in situ chemical reaction is effected at least with the polyfunctional reactant and in such manner as to leave residual reactive functions, which are subsequently reacted with (c) a polymer selected from hydrophilic and polyelectrolyte polymers, and the polymer is subjected to a crosslinking reaction.

The at least one in situ treatment step may comprise at least one of the steps (a) to (g) recited above, and the recited proviso regarding the order of a plurality of such steps also applies.

In a presently preferred embodiment of this aspect of the invention, at least one of (and possibly each of) components (b) and (c) is derived from polyethyleneimine.

It is also presently preferred that at least one of the polyfunctional reactant and the crosslinking agent for polymer (c) includes a reactive dye.

The "diazonium aspect" of the present inventive membranes, described in the preceding several paragraphs, may be applied in a reverse osmosis or ultrafiltration process which comprises the steps of: disposing a solution on one side of such a composite membrane, a solution which it is desired to concentrate or resolve into components; applying a hydraulic pressure which is greater than the osmotic pressure of the solution; and recovering at least one member selected from solution which has passed through the membrane and solution which has remained on the one side of the membrane. Such a process may, for example, be applied to the separation from a solution of organic or metal-organic ionic substances; to the purification of effluents from chemical processes (especially to effluents obtained from the production and use of dyes or fluorescent brighteners); to the separation of inorganic ions from aqueous solutions; and to the concentration of aqueous solutions which contain at least one substance selected from metal complexes, surfactants, dyes and proteins.

The steps of polymer coating and crosslinking, which follow the diazonium step in the "diazonium aspect" embodiment of the present invention, have been described per se in U.S. Pat. Nos. 4,584,103, 4,778,596 and 4,767,645, while the polymers and crosslinkers are also known per se. A diazonium step has been described in U.S. Pat. No. 4,690,766. It should be noted that in the embodiment of the present invention which includes utilizing the invention of the aforementioned Israel Patent Application, the crosslinked acrylonitrile polymer replaces component (a), above.

In the embodiment of the present invention just mentioned, the at least one member of the coating may be (prior to exposure to at least one member selected from nitrous acid and other reagents which potentially react with primary amine groups to form diazonium groups and/or prior to conversion to diazonium-containing entities) an aromatic or aliphatic primary amine; groups which impart desirable properties, e.g. hydrophilicity, may also be present, examples of such groups being hydroxyl, thiol, carboxylic, sulfonic, carbazic and ether groups. Amino groups other than primary may also be present. Aromatic amines may comprise one or more unfused rings or a fused ring systems containing 2, 3, 4 or more fused rings, and comprise one or more primary amino groups desirably directly attached to one or more aromatic rings. Examples are aniline, m- or p-phenylenediamine, diaminonaphthalenes, and aminohydroxynaphthalenedisulfonic acids. Aliphatic (including cyclic aliphatic), aromatic and heterocyclic polymers (including oligomers) containing amine functions (at least part of which must be primary amines, but part may also be secondary and/or tertiary amines) may also be used. Examples are polyethyleneimine (MW in the range $150-2\times 10^6$), possibly partially alkylated or otherwise modified, polyvinylamine (MW in the range $1000-2\times 10^6$), polybenzylamines, polymers of 2-aminoethyl methacrylate, polyvinylimidazoline, amine modified polyepihalohydrins (described in GB 1,558,807), polydiallylamine derivatives, polymers containing piperidine rings (described in GB 2,027,614A), amino polysulfones, amino polyarylene oxides (e.g. aminomethylated polyphenylene oxide), polyamide/-polyamine/epichlorohydrin condensation products, hydrophilic amino-polymers described in EP 8945, and the condensation products of dicyandiamide, amine salts (e.g. $NH_4Cl$) and formaldehyde. The foregoing polymers may be in part a copolymer or a polymer containing other monomeric units, block polymers, or graft polymers, and other monomeric units present (as copolymers or otherwise) may contain the ionic groups $-SO_3^-$, $-COO^-$ or $-N(R)_3^+$. Preferred polymers are poly-aliphatic (acyclic or cyclic) amines such as polyethyleneimines. The polyethyleneimines, which include primary amine groups, as well as secondary and tertiary amine groups, preferably have MW between 1000 and 200,000, more preferably between 10,000 and 70,000, although oligomers of MW between 150 and 1000 may also be used. Generally speaking, the use of such oligomers does not give as great an increase in solute rejection in the final membrane, as when higher molecular weight polymers are used. There may alternatively be used water soluble amphoteric or block mosaic polymers containing both cationic and anionic groups, together with primary amine functions. The amino-polymers may be exposed to the action of at least one member selected from nitrous acid and other reagents which potentially react with primary amine groups to form diazonium groups; when using nitrous acid, for example, this may be effected by (e.g.) dissolving in a sodium nitrite solution and adjusting the pH to less than 2 (preferably to between 0.5 and 1.5). While the present invention is in the presently described embodiment not to be construed as restricted by any theory, it is possible that even in the case of non-aromatic amines which do not form stable diazonium derivatives, there may be formed such derivatives at least transiently. Thus other reagents and conditions which may be expected to give diazonium groups (whether transient or otherwise) may be used instead of the foregoing specified procedure. By way of example only, such other reagents may be alkyl or acyl nitrite esters, nitrous anhydride, NOCl, NOBr, and nitrosonium salts e.g. $NO^+(HSO_4)^-$, $NO^+(ClO_4)^-$ and $NO^+(BF_4)^-$. Water is the preferred solvent in this step, although other solvents such as low molecular weight alcohols or ketones may be used alone, or in combination with water. The concentration of monomer or polymer may be e.g. in the range of from 0.1 to 30%, preferably between 0.5 and 15%, more preferably between 0.5 and 5%, wt./vol. In one alternate method of practising the invention, the polyamines (monomers or polymers) may be exposed to the nitrous acid or the other reagents referred to, after being coated onto the substrate.

The substrate may be immersed in a solution of the at least one member, as a means of applying coating (B) to substrate (A), the latter then being removed and drained. In order to effect the at least one in situ chemical reaction described herein, the coated substrate may then be immersed in a solution having a basic pH, i.e. above 7 and preferably above 10. It may be noted that the in situ chemical reaction, besides forming valence links as already mentioned, may have the additional effect of replacing primary amine and/or diazonium functions originally present in the at least one member by hydroxy and/or azo functions. The time of immersion in the basic solution may vary from 30 seconds to 48 hours, preferably from 1 minute to 4 hours; after immersion, the membrane is rinsed at pH 4 to 7 to remove unreacted material and to restore the membrane to a neutral condition.

The composite membranes according to the present invention are suitable for separating organic compounds of low molecular weight from aqueous solutions containing inorganic salts.

In accordance with one embodiment of the present invention, the acrylonitrile polymer membrane substrate may be asymmetric and therefore when it is coated, the coating will be more dense on one side of the membrane than on the other side, i.e. the coating will itself be asymmetrical. Such a composite membrane which will be especially suitable for separating organic compounds of low molecular weight from inorganic salts in aqueous solution. A presently preferred such asymmetrically coated membrane is one in which the crosslinked acrylonitrile polymer substrate is coated with (1) layer of organic film-forming, hydrophilic polymer, monomeric compound and/or crosslinking agent, and both superimposed thereon and integrally attached thereto, (2) a relatively thin semipermeable interfacially crosslinked film containing ionic (preferably anionic), amphoteric and/or nonionic polar groups. This composite membrane is prepared by the procedure described elsewhere herein.

Preferably, the total thickness of such an asymmetrical coating (1) on the substrate is in the range of about 10-10,000 nm., and the thickness of the film (2) is in the range of about 1-5000 nm.

The inventive membranes are useful for separating solutes such as organic compounds of low molecular weight from aqueous inorganic salt-containing solutions, or from organic solvent/water mixtures or from organic solvents. The present invention also relates to a method for separating these compounds from such media, which comprises disposing them on one side of a semipermeable composite membrane and filtering the media through the membrane by applying a hydraulic pressure (>the osmotic pressure of such media), against the media and the membrane.

The inorganic salts present in the solutions which are subject to the membrane treatment (reverse osmosis) are preferably alkali metal salts such as alkali metal halides or sulfates, e.g. sodium chloride and sodium sulfate.

The inventive membranes, which as already mentioned are suitable for separation (especially RO) processes, can be prepared and used as flat or (preferably) tubular membranes in separation devices such as modules. They have superior rejection characteristics to organic compounds of low molecular weight, good flux properties, superior flexibility, and, in addition to stability in presence of solvents, high overall stability, such as in respect of resistance to compaction, and to chemical and/or biological degradation. They are particularly useful for the purpose of recovering organic compounds of low molecular weight from chemical reaction solutions or waste waters; the recovered compounds can then be re-used, or if desired, otherwise disposed of, especially if they are toxic or dangerous.

The separation effect (rejection) of the composite membranes according to the present invention can be measured as follows. A circular membrane with a surface area of 13 cm.$^2$, resting on a sintered stainless steel disc, is used in a cylindrical cell made of stainless steel. 150 ml. of the solution (to be tested) which contains the solute to be tested in a concentration $C^1$ (g. solute/g. solution) are introduced onto the membrane in the steel cylinder and subjected to a pressure ($N_2$) of 14 bars. The solution is stirred magnetically. The concentration ($C^2$) of the liquid which collects on the outlet side of the membrane is determined, 3 samples of 5 ml. each being taken from the start of the experiment. In general, the amount which flows through the membrane and the composition of the 3 samples are constant. The rejection (R) can be calculated from the values obtained using the equation:

$$R(\%) = (C^1 - C^2) \times 100/C^1.$$

The amount of material (F=flux) passing through the membrane per surface and time unit is determined from the equation:

$$F = V \times S^{-1} \times t^{-1}$$

where V=volume, S=membrane surface area and t=time. F may be expressed in terms of cubic meters of solution per square meter surface area of membrane per day, or in terms of liters of solution per square meter surface area of membrane per hour.

In addition to measurements on flat membranes, measurements on tubular membranes 60 cm. long and with an outer diameter of 1.4 cm. were also carried out. For this purpose the tubular membranes were placed in a perforated tube made of stainless steel. The whole is then placed in a tube made of polycarbonate. The outflow from the membrane is between this outer polycarbonate tube and the steel tube. The liquid is added as a stream of solution in turbulent or laminar flow under pressure. The flow rate is kept constant at 10-15 liters per minute. The rejection (R) and the flux (F) are calculated in a similar manner as before. The invention will now be illustrated by the following non-limiting Examples.

EXAMPLE I

Polyacrylonitrile (98% homopolymer: DuPont A), MW (number average) 50,000, was dissolved in DMF and bob cast onto a tube of nonwoven polyester (1.27 cm. diameter) and gelled in ice-water. After washing overnight, the substrate membrane had a 65% rejection to polyethylene glycol of 60K MW, and 5% rejection to sucrose. The polyacrylonitrile substrate was crosslinked by immersion for 5 minutes in 1% wt./vol. sodium ethoxide, drained and then heated to 115° C. for 30 minutes. The original substrate was off-white or beige, but after this treatment, it was dark brown, and no longer soluble or swellable in DMF, NMP or DMSO. While the original membrane had less than 18% rejection to raffinose, the crosslinked membrane had a rejection of 45% to raffinose and a 94% rejection to dextran 70K. The crosslinked membrane was subsequently modified by the following procedure. It was immersed for 10 minutes in a 0.5% diazonium solution (p-phenylenediamine+sodium nitrite+HCl), then in 2% sodium hydroxide solution for 10 minutes, washed 30 minutes with tap water, crosslinked with cyanuric chloride (2% suspension) at pH 9 and 0° C. for 5 minutes, washed 30 minutes and treated with 8% polyethyleneimine solution at pH 10 for 10 minutes, washed for 2 hours, treated with a reactive dye solution containing 1% Procion Rubine M-B, the dichlorotriazine reaction product of a copper complex of 2-aminophenol-4-sulfonic acid→2-amino-5-naphthol-1,7-disulfonic acid having the formula

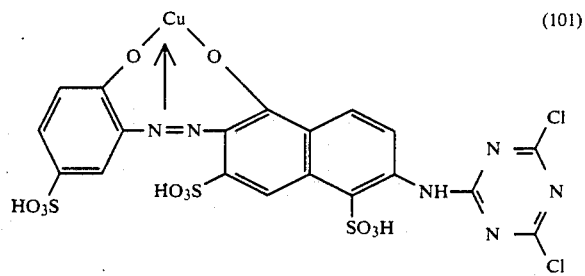

(101)

and 10% NaCl for 15 minutes, immersed in a solution of 2% sodium carbonate for 30 minutes, washed well with tap water for 30 minutes and immersed in sodium hydroxide solution at pH 10 overnight. The resultant composite membrane had a 99% rejection to dextran 2000 MW, 97% to raffinose and 99.9% rejection to Congo Red with a flux of 2000 l/m$^2$.d to water. Before modification the membrane had a rejection to Congo Red of 50%. If, instead of Rubine M-B a reactive dye of the following formula

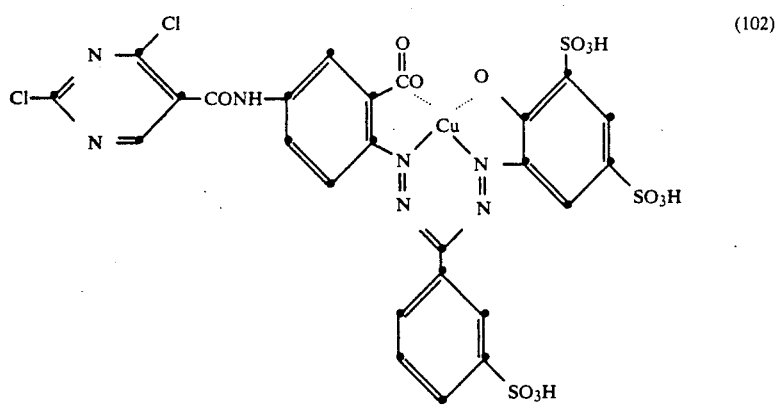
(102)

is used, the product had a rejection to Congo Red above 99% with a flux above 800 l/m².d.

EXAMPLE II

Crosslinked polyacrylonitrile substrate (unmodified) prepared as described in Example I was treated with a 10% solution of sodium hydroxide at 50° C. for 15 minutes, washed well with water, and heated 15 minutes at 110° C. and left in water overnight. The membrane was immersed for 10 minutes in a 0.5% diazonium solution (p-phenylenediamine+sodium nitrite+HCl), then in 2% sodium hydroxide solution for 10 minutes, washed 30 minutes with tap water, crosslinked with cyanuric chloride (2% suspension) at pH 9 and 4° C. for 5 minutes, washed 30 minutes and treated with 8% polyethyleneimine solution at pH 10 for 10 minutes, washed for 2 hours, treated with a solution containing 1% of the dye of the following formula (where R=Cl)

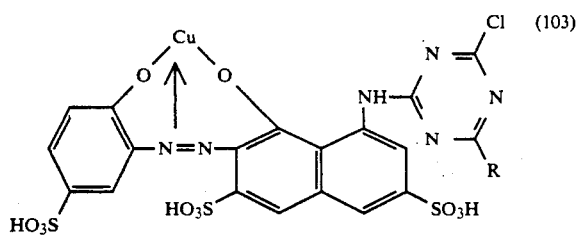
(103)

and 10% NaCl for 15 minutes, immersed in a solution of 2% sodium carbonate for 30 minutes, washed well with tap water for 30 minutes and immersed in sodium hydroxide solution at pH 10 overnight. The unmodified membrane had a 70% rejection to Congo Red, but after modification, 99.9%. The stability of the final composite membrane is shown in Table 1 for common but aggressive polymer solvents. The results show a uniformly high rejection after the tests. If, instead of the specified dye, the reactive dye of the formula depicted at the end of Example I is utilized, the product had a rejection to Congo Red above 99% with a flux above 900 l/m².d

TABLE 1

| Stability to Solvents of the Membrane of Example II. | | | | |
|---|---|---|---|---|
| Run No. | Solvent | Time (hours) | Flux (l · m² · d) at 420 psi | Rejection to 5% Congo Red |
| 1 | water | control | 3540 | 99.92 |
| 2 | *DMF | 170 | 3540 | 99.83 |
| 3 | NaOH 4% (pH 14) | 24 | 2620 | 99.88 |
| 4 | water | control | 1819 | 99.88 |

TABLE 1-continued

| Stability to Solvents of the Membrane of Example II. | | | | |
|---|---|---|---|---|
| Run No. | Solvent | Time (hours) | Flux (l · m² · d) at 420 psi | Rejection to 5% Congo Red |
| 5 | water (100° C.) | 24 | 1819 | 99.73 |
| 6 | **MEK | 24 | 1654 | 99.81 |
| 7 | CH2Cl2 | 24 | 1654 | 99.88 |
| 8 | water | control | 1010 | 99.97 |
| 9 | HCl 1.3% (pH 0.5) | 80 | 1103 | 99.91 |
| 10 | NaOH 0.04% (pH 12) | 80 | 910 | 99.94 |
| 11 | *DMF | 80 | 1233 | 99.93 | room temperature unless otherwise specified
*DMF = dimethylformamide
**MEK = methyl ethyl ketone

EXAMPLE III

Example II was repeated using the following polyacrylonitrile materials for the substrate:
(i) homopolyacrylonitrile MW 120,000;
(ii) acrylonitrile/methacrylate copolymer (93:7);
(iii) acrylonitrile/vinyl acetate copolymer (97:3).

The resultant membranes were all insoluble in DMF and gave the following rejections and fluxes to 1% Congo Red:
(i) 99%, 1206 l/m².d;
(ii) 98%, 3260 l/m².d;
(iii) 99.6%, 1824 l/m².d.

EXAMPLE IV

The crosslinked but otherwise unmodified substrate prepared as in Example II, after the NaOH and heating step, was immersed for 30 minutes in an aqueous solution of 1.2% polyethyleneimine (average MW about 30,000), removed, drained and immersed in a solution of 2% NaNO₂, adjusted to pH 0.45 with HCl, then removed and immersed for 30 minutes in an aqueous bath at pH 12 and rinsed for 30 minutes with tap water. It was then immersed for 10 minutes in a 2% aqueous suspension of cyanuric chloride at 0°–4° C. and washed for 10 minutes with ice water. The next step was immersion for 5 minutes in a 10% aqueous solution of polyeythyleneimine (average MW about 30,000) at pH 8.5, followed by washing with tap water for 2 hours. It was then immersed for 15 minutes in a bath containing 1% of the reactive dye specified in Example I and 10% NaCl, drip-dried for 10 seconds, immersed for 30 minutes in a 2% NaHCO₃ bath at room temperature and washed for 10 minutes with tap water. The performance of the modified membrane was: 98.5% to Congo Red, 94% to sucrose, 15% to NaCl, and a water flux of 1862 $1/m^2.d$.

EXAMPLE V

When in Example I, other amines are substituted for polyethyleneimine, the results as set out in Table 2 were obtained.

TABLE 2

| Amine treated with nitrous acid | Rejection % | Flux* |
|---|---|---|
| Polyvinylamine-HCl (MW 50,000) | 98.2 | 104 |
| Polyvinylamine/vinylsulfonate (80:20) (MW 40,000) | 99.1 | 49 |
| Metaphenylenediamine | 99.0 | 115 |
| Polyvinylaniline | 98.5 | 65 |

*$1./m^2 \cdot h$
Testing conditions: 5% dye (27); 30° C.; 25 bar.

When Example IV was repeated with the same first coating material, but using polyvinylamine instead of polyethyleneimine as the second coating polymer, the resultant composite membranes had above 94% rejection to dye Congo Red.

EXAMPLE VI

Example 1 of U.S. Pat. No. 4,767,645 is repeated using a polyacrylonitrile membrane substrate. After crosslinking with NaOH and heat, the membrane is immersed in an aqueous solution containing 0.5% sodium dodecylsulfonate (SDS), left for 12 hours, and washed for 15 minutes in deionized water. An aqueous solution at pH 10 containing 1% of polyethyleneimine (MW 30,000) and 1.5% of the cationic compound 3,5-dichlorotriazinyl choline, is coated by spreading onto the substrate, left for one minute, drained, and then covered with a 0.3% solution of trimesoyl chloride (TMC) in n-hexane. After one minute, the excess n-hexane solution is drained and the membrane is heat treated by placing it in an oven at 115° C. for 10 minutes. The obtained membrane consists of a cationically charged coating with an anionically charged surface on the substrate. After standing under ambient conditions for 12 hours, the membrane is tested.

An aqueous solution containing 100 ppm of murexide as the test compound and 10% sodium chloride (test solution) gives a flux of 1625 $1./m^2.d$ and rejections of 93% and 11%, respectively. The test is run at room temperature (15° to 22° C.) and under a pressure of 45 bar.

EXAMPLE VII

An RO membrane is made according to the procedure of Example VI without the cationic compound, and with isophthaloyl chloride instead of TMC; the product had a 90% rejection to NaCl.

EXAMPLE VIII

The insolubilized polyacrylonitrile substrate membrane of Example II was immersed in a solution of 3% aqueous solution of metaphenylenediamine, drained and immersed in a TMC solution (0.3% in hexane), drained and heated at 90° C. for 15 minutes. The resultant membrane had a 94% rejection to NaCl.

EXAMPLE IX

A membrane made according to the procedure of Example VIII, but using a 50:50 mixture of TMC and isophthaloyl chloride, had a 20% rejection to NaCl and 95% rejection to sucrose. The membrane did not swell in NMP or DMF after immersion for one week in these solvents.

EXAMPLE X

A crosslinked polyacrylonitrile substrate membrane prepared according to Example II is immersed in an aqueous 1% wt./vol. polyallylamine solution at pH 8.5, drained, immersed in a 0.5% solution of toluene diisocyanate in hexane for 1 minute, drained, and heated at 110° C. for 10 minutes. The resulting membrane had a 96% rejection to 0.5% NaCl.

EXAMPLE XI

Example II is repeated, with the differences that polyvinyl alcohol is used in place of polyethyleneimine, and that in place of any dye, there is used to crosslink the coating ethyleneglycol diglycidyl ether (a 1% aqueous solution at pH 10), applied for 10 hours at room temperature, and the product is drained, and washed in water for 30 minutes; it had a 95% rejection to Congo Red.

While presently preferred modes of operating the invention have been particularly described, it will be evident to those skilled in the art that many modifications and variations are possible. Thus, the invention is not to be construed as limited by the particularly described modes of operation, rather its spirit and scope are to be understood with reference to the claims which follow.

We claim:

1. A composite membrane which comprises:
   (A) a substrate microfiltration, ultrafiltration or reverse osmosis membrane which has been initially formed from at least one member selected from the group consisting of non-crosslinked acrylonitrile homopolymers and copolymers, and non-crosslinked substituted acrylonitrile homopolymers and copolymers, and which has been subjected to at least one in situ crosslinking reaction comprising at least one of the following steps (a) through (g), provided that when said at least one step comprises a plurality of such steps, then the latter are effected in the stated sequence commencing with any of steps (a), (b) or (c):
      (a) treating with at least one member selected from the group consisting of acids, bases, and free radical initiators;
      (b) heating at a temperature which is below about 130° C.;
      (c) heating at a temperature in the region of about 110° to about 130° C.;
      (d) heating at a temperature above about 130° C. and below about 250° C.;
      (e) heating at a temperature in the region of about 250° C.;
      (f) heating at a temperature above about 250° C. and below about 600° C.;
      (g) heating at a temperature within the range of from about 600° C. to about 1000° C.;
      and cooling the thus-obtained substrate membrane to a temperature which is less than about 130° C.; and
   (B) superimposing upon said substrate membrane, at least one coating including at least one component selected from the group consisting of hydrophilic monomers containing reactive functions, hydrophilic oligomers containing reactive functions and hydrophilic polymers containing reactive functions, said reactive functions having been subjected to a post-coating crosslinking reaction.

2. A composite membrane according to claim 1, wherein the at least one coating includes at least one component selected from the group consisting of polyvinyl alcohols, partially esterified polyvinyl alcohols, polyphenols, cellulose derivatives, polybenzyl alcohol, and polymers of hydroxyalkyl acrylates and of hydroxyalkyl methacrylates where hydroxyalkyl contains from 1 to 6 carbon atoms.

3. A composite membrane according to claim 1, wherein in said substituted acrylonitrile, said substituent is selected from the group consisting of alkyl, aryl, halogen and thio.

4. A composite membrane according to claim 1, wherein said substrate membrane is supported on a porous support.

5. A composite membrane according to claim 4, wherein said porous support is fabricated from at least one member selected from the group consisting of nonwoven and woven cellulosics, polyethylene, polypropylene, nylon, vinyl chloride homo- and co-polymers, polystyrene, polyesters such as polyethylene terephthalate, polyvinylidene fluoride, polytetrafluoroethylene, polysulfones, polyether sulfones, polyether ketones, polyphenylene oxide, glass fibers, porous carbon, graphite, inorganic substrates based on alumina, silica or a mixture thereof, and such inorganic substrates coated with zirconium oxides.

6. A composite membrane according to claim 1, wherein said substrate membrane is formed as a hollow fiber or tubelet, or is planar.

7. A composite membrane according to claim 1, wherein following said post-coating crosslinking reaction, said composite membrane is subjected to at least one reaction which introduces at least one function selected from the group consisting of amino, hydroxyl, quaternary ammonium, carbonxylic and sulfonic groups.

8. A composite membrane according to claim 1, wherein said substrate membrane is asymmetric, whereby said at least one coating, on the support side with pores of relatively smaller average diameter, comprises pores less than 50 angstroms in diameter.

9. A composite membrane according to claim 8, which comprises additionally, superimposed thereon and integrally attached thereto, a semipermeable interfacially crosslinked film containing at least one member selected from the group consisting of ionic, amphoteric and nonionic polar moieties.

10. A composite membrane according to claim 1, wherein the thickness of said crosslinked coating lies within the range of from about 1 to about 5000 nm.

11. A composite membrane according to claim 1, wherein said at least one component comprises at least one member selected from the group consisting of:
monomers containing at least one diazonium group,
polymers containing at least one diazonium group,
monomers containing at least one primary amino group and which have been exposed to the action of at least one member selected from the group consisting of nitrous acid and other reagents which potentially react with primary amine groups to form diazonium groups, and
polymers containing at least one primary amino group and which have been exposed to the action of at least one member selected from the group consisting of nitrous acid and other reagents which potentially react with primary amine groups to form diazonium groups; and
wherein said coating has been subjected to at least one in situ chemical reaction with loss of any diazonium groups which may be present, and with formation of valence links in at least one of the modes (i), (ii) and (iii), namely;
(i) among different moieties of said at least one member between themselves;
(ii) between moieties of said at least one member and the material of the substrate; and
(iii) between moieties of said at least one member and a polyfunctional reactant.

12. A composite membrane according to claim 11, whereby said chemical reaction has been effected at least with said polyfunctional reactant and in such manner as to leave residual reactive functions, and said residual reactive functions have been subsequently reacted with a polymer selected from the group consisting of hydrophilic and polyelectrolyte polymers, and said polymer is subjected to a crosslinking reaction.

13. A composite membrane according to claim 12, wherein at least one of component (B) and said polymer selected from the group consisting of hydrophilic and polyelectrolyte polymers, is derived from polyethyleneimine.

14. A composite membrane according to claim 13, wherein both component (B) and said polymer selected from the group consisting of hydrophilic and polyelectrolyte polymers, are derived from polyethyleneimine.

15. A composite membrane according to claim 12, wherein at least one of said polyfunctional reactant and said crosslinking agent includes a reactive dye.

16. A composite membrane according to claim 12, wherein said at least one in situ chemical reaction has been effected in all three modes (i), (ii) and (iii).

17. A composite membrane according to claim 11, wherein in said substituted acrylonitrile, said substituent is selected from the group consisting of alkyl, aryl, halogen and thio.

18. A composite membrane according to claim 11, wherein said substrate membrane is supported on a porous support.

19. A composite membrane according to claim 18, wherein said porous support is fabricated from at least one member selected from the group consisting of nonwoven and woven cellulosics, polyethylene, polypropylene, nylon, vinyl chloride homo- and co-polymers, polystyrene, polyesters such as polyethylene terephthalate, polyvinylidene fluoride, polytetrafluoroethylene, glass fibers, porous carbon, graphite, inorganic substrates based on alumina, silica or a mixture thereof, and such inorganic substrates coated with zirconium oxides.

20. A composite membrane according to claim 11, wherein said substrate membrane is formed as a hollow fiber or tubelet, or is planar.

21. A composite membrane according to claim 11, wherein following said post-coating crosslinking reaction, said composite membrane is subjected to at least one reaction which introduces at least one function selected from the group consisting of amino, hydroxyl, quaternary ammonium, carboxylic and sulfonic groups.

22. A composite membrane according to claim 11, wherein the thickness of said crosslinked coating lies within the range of from about 1 to about 5000 nm.

23. A process for separating at least one dissolved or suspended component from a liquid phase, which comprises contacting said liquid phase under a superatmospheric pressure greater than the osmotic pressure with a composite membrane which comprises:

(A) a substrate microfiltration, ultrafiltration or reverse osmosis membrane which has been initially formed from at least one member selected from the group consisting of non-crosslinked acrylonitrile homopolymers and copolymers, and non-crosslinked substituted acrylonitrile homopolymers and copolymers, and which has been subjected to at least one in situ crosslinking reaction comprising at least one of the following steps (a) through (g), provided that when said at least one step comprises a plurality of such steps, then the latter are effected in the stated sequence commencing with any of steps (a), (b) or (c):
  (a) treating with at least one member selected from the group consisting of acids, bases, and free radical initiators;
  (b) heating at a temperature which is below about 130° C.;
  (c) heating at a temperature in the region of about 110° to about 130° C.;
  (d) heating at a temperature above about 130° C. and below about 250° C.;
  (e) heating at a temperature in the region of about 250° C.;
  (f) heating at a temperature above about 250° C. and below about 600° C.;
  (g) heating at a temperature within the range of from about 600° C. to about 1000° C.; and
  cooling the thus-obtained substrate membrane to a temperature which is less than about 130° C.; and
(B) superimposing upon said substrate membrane, at least one coating including at least one component selected from the group consisting of hydrophilic oligomers containing reactive functions and hydrophilic polymers containing reactive functions, said reactive functions having been subjected to a post-coating crosslinking reaction;
and thereafter recovering said dissolved or suspended component.

24. A process according to claim 23, which is applied to the separation of at least one inorganic salt from at least one organic compound in aqueous media.

25. A process according to claim 24, wherein said at least one organic compound comprises at least one organic compound of molecular weight which lies in the range of from about 150 to about 2000.

26. A process according to claim 25, wherein said at least one organic compound comprises at least one organic compound of molecular weight below about 1500.

27. A process according to claim 24, wherein said at least one organic compound comprises at least one member selected from the group consisting of monosaccharides, disaccharides and polysaccharides.

28. A process according to claim 23, which is applied to the separation in aqueous media of at least one inorganic salt from at least one member selected from the group consisting of ionic inorganic compounds and metal organic ionic complexes.

29. A process according to claim 23, which is applied to the separation of at least one member selected from the group consisting of insoluble particles, colloidal particles, soluble polymers and other solute molecules from a member selected from the group consisting of an organic solvent, water and organic solvent/water mixtures.

30. A process according to claim 29, wherein said organic solvent comprises at least one member selected from the group consisting of alcohols, ethers, dimethylformamide, N-methylpyrrolidone and dimethyl sulfoxide.

31. A process according to claim 23, which is applied to the separation of undesired solute molecules from at least one member selected from the group consisting of juices and other extracts of fruit and vegetable origin.

32. A process according to claim 23, which is applied to the concentration of aqueous solutions which contain at least one substance selected from the group consisting of metal complexes, surfactants, dyes and proteins.

33. A process according to claim 23, wherein the at least one coating includes at least one component selected from the group consisting of polyvinyl alcohols, partially esterified polyvinyl alcohols, polyphenols, cellulose derivatives, polybenzyl alcohol, and polymers of hydroxyalkyl acrylates and of hydroxyalkyl methacrylates where hydroxyalkyl contains from 1 to 6 carbon atoms.

34. A reverse osmosis or ultrafiltration process which comprises the steps of:
  disposing a solution on one side of a composite membrane, a solution which it is desired to concentrate or resolve into components;
  applying a hydraulic pressure which is greater than the osmotic pressure of the solution; and
  recovering at least one member selected from the group consisting of solution which has passed through said membrane and solution which has remained on the said one side of said membrane, wherein said composite membrane comprises:
(A) a substrate microfiltration, ultrafiltration or reverse osmosis membrane which has been initially formed from at least one member selected from the group consisting of non-crosslinked acrylonitrile homopolymers and copolymers, and non-crosslinked substituted acrylonitrile homopolymers and copolymers, and which has been subjected to at least one in situ crosslinking reaction comprising at least one of the following steps (a) through (g), provided that when said at least one step comprises a plurality of such steps, then the latter are effected in the stated sequence commencing with any of steps (a), (b) or (c):
  (a) treating with at least one member selected from the group consisting of acids, bases, and free radical initiators;
  (b) heating at a temperature which is below about 130° C.;
  (c) heating at a temperature in the region of about 110° to about 130° C.;
  (d) heating at a temperature above about 130° C. and below about 250° C.;
  (e) heating at a temperature in the region of about 250° C.;
  (f) heating at a temperature above about 250° C. and below about 600° C.;
  (g) heating at a temperature within the range of from about 600° C. to about 1000° C.;
  and cooling the thus-obtained substrate membrane to a temperature which is less than about 130° C.; and (B) superimposing upon said substrate membrane, at least one coating including at least one component selected from the group consisting of hydrophilic monomers containing reactive functions, hydrophilic oligomers containing reactive functions and hydrophilic polymers containing reactive functions, said reactive functions having been subjected to a post-coating crosslinking reaction, wherein said at least one component comprises at least one member selected from the group consisting of:

monomers containing at least one diazonium group, polymers containing at least one diazonium group, monomers containing at least one primary amino group and which have been exposed to the action of at least one member selected from the group consisting of nitrous acid and other reagents which potentially react with primary amine groups to form diazonium groups, and polymers containing at least one primary amino group and which have been exposed to the action of at least one member selected from the group consisting of nitrous acid and other reagents which potentially react with primary amine groups to form diazonium groups; and wherein said coating has been subjected to at least one in situ chemical reaction with loss of any diazonium groups which may be present, and with formation of valence links in at least one of the modes (i), (ii) and (iii), namely;

(i) among different moieties of said at least one member between themselves;

(ii) between moieties of said at least one member and the material of the substrate; and (iii) between moieties of said at least one member and a polyfunctional reactant.

35. A process according to claim 34, which is applied to the separation from a solution of at least one member selected from the group consisting of organic and metal-organic ionic substances.

36. A process according to claim 34, which is applied to the purification of effluents from chemical processes.

37. A process according to claim 34, which is applied to the purification of effluents obtained from the production and use of at least one substance selected from the group consisting of dyes and fluorescent brighteners.

38. A process according to claim 34, which is applied to the separation of inorganic ions from aqueous solutions.

39. A process according to claim 34, which is applied to the concentration of aqueous solutions which contain at least one substance selected from the group consisting of metal complexes, surfactants, dyes and proteins.

40. A process for separating at least one dissolved or suspended component from a liquid phase, which comprises contacting said liquid phase under a superatmospheric pressure greater than the osmotic pressure with a composite membrane which comprises:

(A) an asymmetric substrate microfiltration, ultrafiltration or reverse osmosis membrane which has been initially formed from at least one member selected from the group consisting of non-crosslinked acrylonitrile homopolymers and copolymers, and non-crosslinked substituted acrylonitrile homopolymers and copolymers, and which has been subjected to at least one in situ crosslinking reaction comprising at least one of the following steps (a) through (g), provided that when said at least one step comprises a plurality of such steps, then the latter are effected in the stated sequence commencing with any of steps (a), (b) or (c):

(a) treating with at least one member selected from the group consisting of acids, bases, and free radical initiators;

(b) heating at a temperature which is below about 130° C.;

(c) heating at a temperature in the region of about 110° to about 130° C.;

(d) heating at a temperature above about 130° C. and below about 250° C.;

(e) heating at a temperature in the region of about 250° C.;

(f) heating at a temperature above about 250° C. and below about 600° C.;

(g) heating at a temperature within the range of from about 600° C. to about 1000° C.; and cooling the thus-obtained substrate membrane to a temperature which is less than about 130° C.; and (B) superimposing upon said substrate membrane, at least one coating including at least one component selected from the group consisting of hydrophilic oligomers containing reactive functions and hydrophilic polymers containing reactive functions, said reactive functions having been subjected to a post-coating crosslinking reaction and said at least one coating being more dense on one side than on the other of said substrate membrane in consequence of said substrate membrane being asymmetric;

and thereafter recovering said dissolved or suspended component.

41. A process according to claim 40, wherein said composite membrane comprises additionally, superimposed thereon and integrally attached thereto, a semipermeable interfacially crosslinked film containing at least one member selected from the group consisting of ionic, amphoteric and nonionic polar moieties.

42. A process according to claim 40, which is applied to the separation of at least one member selected from the group consisting of insoluble particles, colloidal particles, soluble polymers and other solute molecules from a member selected from the group consisting of an organic solvent, water and organic solvent/water mixtures.

43. A process according to claim 41, which is applied to the separation of at least one member selected from the group consisting of insoluble particles, colloidal particles, soluble polymers and other solute molecules from a member selected from the group consisting of an organic solvent, water and organic solvent/water mixtures.

44. A process according to claim 40, wherein the at least one coating includes at least one component selected from the group consisting of polyvinyl alcohols, partially esterified polyvinyl alcohols, polyphenols, cellulose derivatives, polybenzyl alcohol, and polymers of hydroxyalkyl acrylates and of hydroxyalkyl methacrylates where hydroxyalkyl contains from 1 to 6 carbon atoms.

* * * * *